US008086842B2

(12) United States Patent
Sidhu et al.

(10) Patent No.: US 8,086,842 B2
(45) Date of Patent: Dec. 27, 2011

(54) PEER-TO-PEER CONTACT EXCHANGE

(75) Inventors: Gursharan Sidhu, Seattle, WA (US);
Noah Horton, Sammamish, WA (US);
Sandeep K. Singhal, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1006 days.

(21) Appl. No.: 11/408,894

(22) Filed: Apr. 21, 2006

(65) Prior Publication Data

US 2007/0250700 A1  Oct. 25, 2007

(51) Int. Cl.
*H04L 29/00* (2006.01)
(52) U.S. Cl. ........ 713/150; 713/165; 713/168; 713/175; 713/193
(58) Field of Classification Search .................. 713/150, 713/168, 175, 165, 171, 193
See application file for complete search history.

(56) References Cited

U.S. PATENT DOCUMENTS

| | | |
|---|---|---|
| 5,005,200 A | 4/1991 | Fischer |
| 5,473,691 A | 12/1995 | Menezes et al. |
| 5,511,122 A | 4/1996 | Atkinson |
| 5,563,998 A | 10/1996 | Yaksich et al. |
| 5,673,319 A | 9/1997 | Bellare et al. |
| 5,729,608 A | 3/1998 | Janson et al. |
| 5,746,691 A | 5/1998 | Frantzen |
| 5,778,065 A | 7/1998 | Hauser et al. |
| 5,784,562 A | 7/1998 | Diener |
| 5,787,172 A | 7/1998 | Arnold |
| 5,848,244 A * | 12/1998 | Wilson ............... 709/221 |
| 5,854,898 A | 12/1998 | Riddle |
| 5,892,904 A | 4/1999 | Atkinson et al. |
| 5,903,721 A | 5/1999 | Sixtus |
| 5,917,480 A | 6/1999 | Tafoya et al. |
| 5,944,794 A | 8/1999 | Okamoto et al. |
| 5,987,376 A | 11/1999 | Olson et al. |
| 6,028,938 A | 2/2000 | Malkin et al. |
| 6,055,234 A | 4/2000 | Aramaki |
| 6,055,236 A | 4/2000 | Nessett |
| 6,078,948 A | 6/2000 | Podgorny et al. |
| 6,088,700 A | 7/2000 | Larsen et al. |
| 6,088,805 A | 7/2000 | Davis et al. |
| 6,101,499 A | 8/2000 | Ford et al. |
| 6,108,673 A | 8/2000 | Brandt et al. |
| 6,108,687 A | 8/2000 | Craig |
| 6,128,738 A | 10/2000 | Doyle et al. |

(Continued)

FOREIGN PATENT DOCUMENTS

CN   1716855   4/2006

(Continued)

OTHER PUBLICATIONS

International Search Report for PCT/US2007/010092 mailed Oct. 15, 2007.

(Continued)

*Primary Examiner* — Vivek Srivastava
*Assistant Examiner* — Anthony Brown

(57) ABSTRACT

A system may publish authenticated contact information in a publicly available index store, retrieve the contact information, and validate it. The claimed method and system may provide a client-based, server optional approach to publishing. The publicly available index store may be a distributed hash table used in a peer-to-peer network. The system may be used in other secure directory service applications where a server may not be available or where server trust may be minimal.

19 Claims, 12 Drawing Sheets

U.S. PATENT DOCUMENTS

| | | | |
|---|---|---|---|
| RE36,946 E | 11/2000 | Diffie et al. | |
| 6,148,405 A | 11/2000 | Liao et al. | |
| 6,154,541 A | 11/2000 | Zhang | |
| 6,155,840 A | 12/2000 | Sallette | |
| 6,163,809 A | 12/2000 | Buckley | |
| 6,175,833 B1 | 1/2001 | West et al. | |
| 6,216,110 B1 | 4/2001 | Silverberg | |
| 6,229,806 B1 | 5/2001 | Lockhart et al. | |
| 6,233,606 B1 | 5/2001 | Dujari | |
| 6,237,025 B1 | 5/2001 | Ludwig et al. | |
| 6,237,035 B1 | 5/2001 | Himmel et al. | |
| 6,247,029 B1 | 6/2001 | Kelley et al. | |
| 6,269,099 B1 | 7/2001 | Borella et al. | |
| 6,279,110 B1 | 8/2001 | Johnson et al. | |
| 6,308,266 B1 | 10/2001 | Freeman | |
| 6,327,652 B1 | 12/2001 | England et al. | |
| 6,341,349 B1 | 1/2002 | Takaragi et al. | |
| 6,363,352 B1 | 3/2002 | Dailey et al. | |
| 6,367,009 B1 | 4/2002 | Davis et al. | |
| 6,367,012 B1 | 4/2002 | Atkinson et al. | |
| 6,397,303 B1 | 5/2002 | Arimilli et al. | |
| 6,405,290 B1 | 6/2002 | Arimilli et al. | |
| 6,421,673 B1 | 7/2002 | Caldwell et al. | |
| 6,424,718 B1 | 7/2002 | Holloway | |
| 6,424,981 B1 | 7/2002 | Isaac et al. | |
| 6,526,411 B1 | 2/2003 | Ward | |
| 6,526,506 B1 | 2/2003 | Lewis | |
| 6,529,932 B1 | 3/2003 | Dadiomov et al. | |
| 6,578,143 B1 | 6/2003 | Rose | |
| 6,598,083 B1 | 7/2003 | Renier et al. | |
| 6,600,823 B1 | 7/2003 | Hayosh | |
| 6,615,348 B1 | 9/2003 | Gibbs | |
| 6,636,899 B1 | 10/2003 | Rabb et al. | |
| 6,658,568 B1 | 12/2003 | Ginter et al. | |
| 6,671,804 B1 * | 12/2003 | Kent | 713/175 |
| 6,675,205 B2 | 1/2004 | Meadway et al. | |
| 6,687,755 B1 | 2/2004 | Ford et al. | |
| 6,701,344 B1 | 3/2004 | Holt et al. | |
| 6,714,966 B1 | 3/2004 | Holt et al. | |
| 6,728,753 B1 | 4/2004 | Parasnis et al. | |
| 6,732,110 B2 | 5/2004 | Rjaibi et al. | |
| 6,745,178 B1 | 6/2004 | Emens et al. | |
| 6,782,103 B1 * | 8/2004 | Arthan et al. | 380/278 |
| 6,782,294 B2 | 8/2004 | Reich et al. | |
| 6,789,189 B2 * | 9/2004 | Wheeler et al. | 713/156 |
| 6,791,582 B2 | 9/2004 | Linsey et al. | |
| 6,801,604 B2 | 10/2004 | Maes et al. | |
| 6,832,322 B1 | 12/2004 | Boden | |
| 6,938,166 B1 | 8/2005 | Sarfati et al. | |
| 6,941,366 B2 | 9/2005 | Antes et al. | |
| 6,941,384 B1 | 9/2005 | Aiken, Jr. et al. | |
| 6,944,672 B2 | 9/2005 | Crow et al. | |
| 6,957,346 B1 | 10/2005 | Kivinen et al. | |
| 6,968,179 B1 | 11/2005 | De Vries | |
| 7,032,242 B1 | 4/2006 | Grabelsky et al. | |
| 7,051,202 B2 * | 5/2006 | Tsunoo | 713/165 |
| 7,129,891 B2 | 10/2006 | Meunier | |
| 7,134,019 B2 | 11/2006 | Shelest et al. | |
| 7,216,233 B1 | 5/2007 | Krueger | |
| 7,370,197 B2 | 5/2008 | Huitema | |
| 7,409,544 B2 | 8/2008 | Aura | |
| 7,478,120 B1 | 1/2009 | Zhang | |
| 7,624,264 B2 | 11/2009 | Aura et al. | |
| 7,929,689 B2 | 4/2011 | Huitema et al. | |
| 2001/0010720 A1 | 8/2001 | Kimball et al. | |
| 2001/0013050 A1 | 8/2001 | Shah | |
| 2001/0019609 A1 | 9/2001 | Tsunoo | |
| 2001/0035976 A1 | 11/2001 | Poon | |
| 2001/0053213 A1 | 12/2001 | Truong et al. | |
| 2002/0032765 A1 | 3/2002 | Pezzutti | |
| 2002/0073204 A1 | 6/2002 | Dutta et al. | |
| 2002/0097267 A1 | 7/2002 | Dinan et al. | |
| 2002/0133607 A1 | 9/2002 | Nikander | |
| 2002/0140730 A1 | 10/2002 | Linsey et al. | |
| 2002/0143989 A1 | 10/2002 | Huitema et al. | |
| 2002/0152380 A1 | 10/2002 | O'Shea et al. | |
| 2002/0152384 A1 | 10/2002 | Shelest et al. | |
| 2002/0154172 A1 | 10/2002 | Linsey et al. | |
| 2002/0156875 A1 | 10/2002 | Pabla | |
| 2002/0184358 A1 | 12/2002 | Traversat et al. | |
| 2003/0014485 A1 | 1/2003 | Banatwala | |
| 2003/0018701 A1 | 1/2003 | Kaestle | |
| 2003/0018813 A1 | 1/2003 | Antes et al. | |
| 2003/0028585 A1 | 2/2003 | Yeager et al. | |
| 2003/0036941 A1 | 2/2003 | Leska et al. | |
| 2003/0055892 A1 | 3/2003 | Huitema et al. | |
| 2003/0065934 A1 | 4/2003 | Angelo et al. | |
| 2003/0070067 A1 | 4/2003 | Saito | |
| 2003/0079024 A1 | 4/2003 | Hough et al. | |
| 2003/0083544 A1 | 5/2003 | Richards et al. | |
| 2003/0088544 A1 | 5/2003 | Kan et al. | |
| 2003/0110274 A1 | 6/2003 | Pazi et al. | |
| 2003/0120929 A1 | 6/2003 | Hoffstein et al. | |
| 2003/0126027 A1 | 7/2003 | Nelson et al. | |
| 2003/0126436 A1 | 7/2003 | Greenberg et al. | |
| 2003/0135629 A1 | 7/2003 | Sasaki et al. | |
| 2003/0142823 A1 | 7/2003 | Swander et al. | |
| 2003/0163683 A1 | 8/2003 | Xu et al. | |
| 2003/0196060 A1 | 10/2003 | Miller | |
| 2003/0217073 A1 | 11/2003 | Walther et al. | |
| 2003/0217106 A1 | 11/2003 | Adar et al. | |
| 2003/0233568 A1 | 12/2003 | Maufer et al. | |
| 2004/0008845 A1 | 1/2004 | Le et al. | |
| 2004/0010683 A1 | 1/2004 | Huitema | |
| 2004/0010688 A1 * | 1/2004 | Matsuzaki et al. | 713/169 |
| 2004/0034794 A1 | 2/2004 | Mayer | |
| 2004/0054885 A1 | 3/2004 | Bartram et al. | |
| 2004/0063401 A1 | 4/2004 | Meckelburg et al. | |
| 2004/0064693 A1 * | 4/2004 | Pabla et al. | 713/168 |
| 2004/0078436 A1 | 4/2004 | Demsky et al. | |
| 2004/0082351 A1 | 4/2004 | Westman | |
| 2004/0088325 A1 | 5/2004 | Elder et al. | |
| 2004/0088537 A1 | 5/2004 | Swander et al. | |
| 2004/0111423 A1 | 6/2004 | Irving et al. | |
| 2004/0117446 A1 | 6/2004 | Swanson | |
| 2004/0122898 A1 | 6/2004 | Srinivasa | |
| 2004/0122901 A1 | 6/2004 | Sylvain | |
| 2004/0128350 A1 | 7/2004 | Topfl et al. | |
| 2004/0141005 A1 | 7/2004 | Banatwala et al. | |
| 2004/0143603 A1 | 7/2004 | Kaufmann et al. | |
| 2004/0151322 A1 | 8/2004 | Sovio et al. | |
| 2004/0158714 A1 | 8/2004 | Peyravian et al. | |
| 2004/0172455 A1 | 9/2004 | Green et al. | |
| 2004/0172456 A1 | 9/2004 | Green et al. | |
| 2004/0181689 A1 | 9/2004 | Kiyoto | |
| 2004/0193875 A1 | 9/2004 | Aura | |
| 2004/0225881 A1 | 11/2004 | Walmsley | |
| 2004/0243819 A1 | 12/2004 | Bourne et al. | |
| 2004/0249757 A1 | 12/2004 | Walmsley et al. | |
| 2004/0249970 A1 | 12/2004 | de Castro et al. | |
| 2004/0249972 A1 | 12/2004 | White et al. | |
| 2004/0260761 A1 | 12/2004 | Leaute et al. | |
| 2004/0260771 A1 | 12/2004 | Gusler et al. | |
| 2005/0009537 A1 | 1/2005 | Crocker et al. | |
| 2005/0027794 A1 * | 1/2005 | Carpentier et al. | 713/193 |
| 2005/0027805 A1 | 2/2005 | Aoki | |
| 2005/0027871 A1 | 2/2005 | Bradley | |
| 2005/0038856 A1 | 2/2005 | Krishnasamy et al. | |
| 2005/0053220 A1 | 3/2005 | Stochosky | |
| 2005/0055280 A1 | 3/2005 | Jeans | |
| 2005/0066001 A1 | 3/2005 | Benco et al. | |
| 2005/0076218 A1 | 4/2005 | Brown | |
| 2005/0080859 A1 | 4/2005 | Lake | |
| 2005/0091284 A1 | 4/2005 | Weissman et al. | |
| 2005/0102245 A1 | 5/2005 | Edlund et al. | |
| 2005/0102356 A1 | 5/2005 | Manion et al. | |
| 2005/0135381 A1 | 6/2005 | Dubnicki et al. | |
| 2005/0138393 A1 | 6/2005 | Challener et al. | |
| 2005/0160291 A1 | 7/2005 | Eden et al. | |
| 2005/0160477 A1 | 7/2005 | Saito | |
| 2005/0171799 A1 | 8/2005 | Hull et al. | |
| 2005/0182928 A1 | 8/2005 | Kamalanathan et al. | |
| 2005/0193219 A1 | 9/2005 | Vanstone | |
| 2005/0198173 A1 | 9/2005 | Evans | |
| 2005/0203901 A1 | 9/2005 | Waldvogel et al. | |
| 2005/0220023 A1 | 10/2005 | Kodialam et al. | |
| 2005/0228824 A1 | 10/2005 | Gattuso et al. | |

| | | | |
|---|---|---|---|
| 2005/0235038 | A1 | 10/2005 | Donatella et al. |
| 2006/0005014 | A1 | 1/2006 | Aura et al. |
| 2006/0020796 | A1 | 1/2006 | Aura et al. |
| 2006/0020807 | A1 | 1/2006 | Aura et al. |
| 2006/0077908 | A1 | 4/2006 | Park et al. |
| 2006/0173959 | A1 | 8/2006 | McKelvie et al. |
| 2006/0265436 | A1 | 11/2006 | Edmond et al. |
| 2007/0008987 | A1 | 1/2007 | Manion et al. |
| 2007/0055877 | A1* | 3/2007 | Persson et al. ............... 713/171 |
| 2007/0143619 | A1 | 6/2007 | Goodman et al. |
| 2007/0192676 | A1 | 8/2007 | Bodin et al. |
| 2007/0245144 | A1* | 10/2007 | Wilson ......................... 713/170 |
| 2008/0222127 | A1 | 9/2008 | Bergin |
| 2009/0019141 | A1 | 1/2009 | Bush et al. |

FOREIGN PATENT DOCUMENTS

| | | |
|---|---|---|
| EP | 1 248 441 A2 | 10/2002 |
| EP | 1333635 | 8/2003 |
| EP | 1 361 728 A2 | 11/2003 |
| EP | 1473899 | 11/2004 |
| FR | 2851704 | 2/2003 |
| GB | 2378268 | 2/2003 |
| JP | 2002197246 | 7/2002 |
| JP | 2003157412 | 5/2003 |
| JP | 2004030611 | 1/2004 |
| JP | 2006048654 | 2/2006 |
| KR | 1020030032327 | 4/2003 |
| KR | 1020040002036 | 1/2004 |
| KR | 1020050056988 | 5/2006 |
| WO | WO-0120450 | 3/2001 |
| WO | WO-2004049130 | 11/2003 |
| WO | WO-2004009550 | 1/2004 |
| WO | WO-2005/026872 A2 | 3/2005 |
| WO | WO-2005/078993 A1 | 8/2005 |
| WO | WO-2006068450 | 6/2006 |
| WO | WO-2007006008 | 1/2007 |

OTHER PUBLICATIONS

Written Opinion for PCT/US2007/010092 mailed Oct. 15, 2007.
Jianming Lv et al., "*WonGoo: A Pure Peer-to-Peer Full Text Information Retrieval System Based On Semantic Overlay Networks*;" Institute of Computing Technology Chinese Academy of Sciences Beijing, China; Proceeding of the Third IEEE International Symposium on Network Computing and Applications (NCA '04); dated Apr. 2004; 8 pages; http://portal.acm.org/citation.cfm?id=1025126.1025936.
Ajmani et al., "ConChord: Cooperative SDSI Certificate Storage and Name Resolution," First International Workshop on Peer-to-Peer Systems (IPTPS), Mar. 2002.
Beaver, K., "Are P2P Applications Worth the Risk?" 2005 TechTarget, http://searchsecurity.techtarget.com/tip/1,289483,sid14_gci929175,00.html, 5 pages.
Campbell, C., "Securing Your Peer-to-Peer Networks," TechTarget, Sep. 12, 2001, http://searchsecurity.techtarget.com/originalContent/0,289142,sid14_gci769396,00.html?MOTT=9.25.
Ellison, C., et al., Simple Public Key Certificate, (Internet Draft 1999), at http://www.world.std.com/~cme/spki.txt (Aug. 6, 2001).
Ellison, C., et al., SPKI Certificate Theory, (The Internet Society 1999), at http://www.ietf.org/rfc/rfc2693.txt?number=2693 (Aug. 6, 2001).
Ellison, C., SPKI Requirements, (The Internet Society 1999), at http://www.ietf.org/rfc/rfc2692.txt?number=2692 (Aug. 6, 2001).
Erdelsky, P., The Birthday Paradox, EFG, at http://www.efgh.com/math/birthday.htm (Mar. 8, 2002).
Housley et al., "Internet X.509 Public Key Infrastructure Certificate and CRL Profile." Network Working Group (Jan. 1999), pp. 1-121, retrieved from http://www..ietf.org/rfc/rfc2459.txt?number=2459 Sep. 18, 2003.
Kim et al., "A Secure Platform for Peer-to-Peer Computing in the Internet," Proceedings of the 35th Hawaii International Conference on System Sciences, IEEE Computer Society, 2002, pp. 3948-3957.
Langley, A., The Freenet Protocol, The Free Network Project, at http://freenet.sourceforge.net/index/php?page=protocol (May 21, 2001).
Mazieres et al., "Separating Key Management from File System Security," Operating Systems Review ACM, vol. 33, No. 5, Dec. 1999, pp. 124-139.
Red-Black Tree, National Institute of Standards and Technology, at http://www.nist.gov/dads/HTML/redblack.html (Mar. 5, 2002).
J. Schlyter & W. Griffin, "*Using DNS To Securely Publish Secure Shell (SSH) Key Fingerprints*,"The Internet Society (2006), ftp://ftp.rfc-editor.org/in-notes/rfc4255.txt, dated Oct. 2, 2006, 9 pages.
Balke et al., "*Caching for Improved Retrieval in Peer-to-Peer Networks*," L3S Research Center and University of Hannover, 6 pages; http://www.13s.de/apis/paper/gi-itg05.pdf (2005).
Chen et al., "*A Scalable Semantic Indexing Framework for Peer-to-Peer Information Retrieval*," 8 pages; http://hdir2005.isti.cnr.it/camera-ready/7.Chen.pdf (2005).
Chien, E., "Malicious Threats of Peer-to-Peer Networking," Symantec, http://enterprisesecurity.symantec.com/PDF/malicious_threats.pdf (Dec. 2001).
Dabek et al.,*Building Peer-to-Peer Systems With Chord, a Distributed Lookup Serivce*, at MIT Laboratory for Computer Science, 6 pages, at http://pdos.lcs.mit.edu/chord (May 2001).
DeFigueiredo et al., "Analysis of Peer-to-Peer Network Security Using Gnutella," http://www.cs.berkeley.edu/~daw/teaching/cs261-f02/reports/defig.pdf (2002).
Druschel et al., *PAST: A large-scale, persistent peer-to-peer storage utility*, at Rice University and Microsoft Research, 6 pages (Nov. 2001).
Lai et al., *Measuring Link Bandwidths Using a Deterministic Model of Packet Delay*, at Department of Computer Science at Stanford University, 13 pages (Oct. 2000).
Rowstron et al., *Pastry: Scalable, distributed object location and routing for large-scale peer-to-peer systems*, at Microsoft Research, Ltd., St. George House and Rice University, 20 pages (Nov. 2001).
Rowstron et al., *SCRIBE: The design of a large-scale event notification infrastructure*, at Microsoft Research, Ltd., St. George House and Rice University, 20 pages (2001).
Rowstron et al., *Storage management and caching in PAST, a large-scale, persistent peer-to-peer storage utility*, at Microsoft Research, Ltd., St. George House and Rice University, 14 pages (2001).
"Notice of Allowance", U.S. Appl. No. 10/882,079, (Mar. 4, 2011), 8 pages.
"Secure Hash Standard", Federal Information Processing Standards Publication 180-1, available at <http://www.itl.nist.gov/fipspubs/fip180-1.htm>,(Apr. 17, 1995),16 pages.
"Final Office Action", U.S. Appl. No. 11/175,951, (Mar. 12, 2009), 17 pages.
"Finding Friendly People Near Me", http://www.new2uk.org/Templates/n2uk-finding-home.html, (Jul. 1, 2005), 1 page.
"MSN Launches New Internet Search Service Designed to Give More-Precise Answers in Less Time" http://www.microsoft.com/presspass/perss/2005/feb05/02-01NewEnginePR.mspx, (Feb. 1, 2005), 3 pages.
"Non Final Office Action", U.S. Appl. No. 11/175,951, (Jul. 29, 2008), 11 pages.
"What is AOL Messenger", retrieved from <http://www.aol.com.au/site/website/aolproducts/aim/whatis.php> on Jul. 1, 2005, 2 pages.
"Yahoo! Address Book explanation", retrieved from <http://messenger.yahoo.com/addressbook.php> on Jul. 1, 2005, 2 pages.
"Foreign Office Action", Australian Application No. 2007240567, (May 9, 2011), 2 pages.
"About Presentation Broadcasting", http://office.microsoft.com/en-us/assistance/HP052411931033.aspx, (Jul. 1, 2005), 3 pages.
"Connecting and Extending Peer-to-Peer Networks", Lion Share White Paper; http://lionshare.its.psu.edu/main/info/docspresentation/LionshareWP.pdf, Lion Share WP.pdf, (Oct. 2004), 32 pages.
"Design Explorations", *IBM Research; Social Computing Group*, (Apr. 19, 2005), 4 pages.
"European Search Report", EP Application No. 05105417.9-2212, The Hague, (Aug. 17, 2006), 2 pages.
"Final Office Action", U.S. Appl. No. 10/242,705, (Feb. 9, 2007), 15 pages.
"Final Office Action", U.S. Appl. No. 10/882,079, (Feb. 5, 2010), 9 pages.

"Final Office Action", U.S. Appl. No. 10/882,079, (Aug. 4, 2008), 9 pages.
"Final Office Action", U.S. Appl. No. 11/159,555, (Apr. 20, 2011), 25 pages.
"Final Office Action", U.S. Appl. No. 11/159,555, (Aug. 3, 2010), 21 pages.
"Final Office Action", U.S. Appl. No. 11/159,555, (Nov. 12, 2009), 20 pages.
"Foreign Office Action", Chinese Application No. 200680024733.2, (May 24, 2010),13 pages.
"Foreign Office Action", Russian Application No. 2008141720, (May 3, 2011), 6 pages.
"Glossary for the Linux FreeS/WAN Project", 22 pages.
"IBM Lotus Instant Messaging and Web Conferencing", IBM Software—IBM Lotus Instant Messaging and Web Conferencing home page, (Apr. 19, 2005), 3 pages.
"IBM Workplace Collaboration Services Overview Guide", printed from ftp://ftp.lotus.com/pub/lotusweb/IGM_Workplace_collaboration_service_g224733301_118.pdf, (Jul. 1, 2005), 2 pages.
"Interoperable Home Infrastructure", *Intel Technology Journal*, vol. 6 Issue 4, ISSN 1535-766X, (Nov. 15, 2001), 78 pages.
"ITU-T recommendation X.690, Information Technology—ASN.1 Encoding Rules: Specification of Basic Encoding Distinguished Encoding Rules (BER), Canonical Encoding Rules (CER) and Distinguished Encoding Rules (DER)", *International Telecommunication Union*, (Jul. 2002), 36 pages.
"Meeting Maker", *Meeting Maker printout*;http://www.meetingmaker.com/products/meetingmaker/default.cfm, (Jul. 1, 2005), 2 pages.
"Minutes of IPSEC Working Group Meeting", IPSEC, 2.5.2 IP Security Protocol (IPsec), Proceedings of the 52nd Internet Engineering Task Force, Salt Lake City, USA, (Dec. 2001), 14 pages.
"Non-Final Office Action", U.S. Appl. No. 10/242,705, (Feb. 16, 2006),13 pages.
"Non-Final Office Action", U.S. Appl. No. 10/242,705, (Aug. 8, 2006),16 pages.
"Non-Final Office Action", U.S. Appl. No. 10/401,241, (Jan. 25, 2007), 6 pages.
"Non-Final Office Action", U.S. Appl. No. 10/401,241, (Oct. 19, 2007), 7 pages.
"Non-Final Office Action", U.S. Appl. No. 10/882,079, (Apr. 16, 2009),10 pages.
"Non-Final Office Action", U.S. Appl. No. 10/882,079, (Aug. 24, 2007), 9 pages.
"Non-Final Office Action", U.S. Appl. No. 11/159,555, (Mar. 17, 2010),18 pages.
"Non-Final Office Action", U.S. Appl. No. 11/159,555, (Apr. 9, 2009),15 pages.
"Non-Final Office Action", U.S. Appl. No. 11/159,555, (Nov. 19, 2010), 22 pages.
"Non-Final Office Action", U.S. Appl. No. 11/170,296, (Dec. 3, 2008),14 pages.
"Notice of Allowance", U.S. Appl. No. 10/242,705, (Dec. 17, 2007),12 pages.
"Notice of Allowance", U.S. Appl. No. 10/401,241, (Apr. 25, 2008), 6 pages.
"Notice of Allowance", U.S. Appl. No. 10/882,079, (Jun. 24, 2010), 7 pages.
"Notice of Allowance", U.S. Appl. No. 10/882,079, (Nov. 12, 2010), 7 pages.
"Notice of Allowance", U.S. Appl. No. 11/170,296, (Sep. 21, 2009), 2 pages.
"Notice of Allowance", U.S. Appl. No. 11/170,296, (Sep. 22, 2009), 2 pages.
"PCT International Search Report", Application No. PCT/US06/25342, (Feb. 6, 2008), 3 pages.
"Publication Related to Pastry", retrieved from http://research.microsoft.com/~antr/Pastry/pubs.htm on Jun. 23, 2005, 2 pages.
"Quicktime Broadcaster", http://www.apple.com/quicktime/broadcaster/, (Jul. 1, 2005), 3 pages.
"Restriction Requirement", U.S. Appl. No. 10/401,241, (Oct. 10, 2006), 8 pages.
"Security and Mobile IPv6", *IETF Proceedings*, (Mar. 2001), 1 page.

"The Gnutella Protocol Specification v0.4", http://www.clip2.com; published in 2001 per http://www.peer-to-peer.info/biblioqraphy/clip22001gnutella, 10 pages.
"Written Opinion for PCT/US2007/009887", (Oct. 22, 2007), 4 pages.
"Written Opinion for PCT/US2007/010092", (Oct. 15, 2007), 4 pages.
Anderson, R et al., "Security Policies", 43 pages.
Arkko, Jari et al., "Securing IPv6 Neighbor Discovery And Router Discovery", In Proc. 2002 ACM Workshop on Wireless Security (WiSe), (Sep. 2002), pp. 77-86.
Aura, T "Cryptographically Generated Addresses (CGA)", RFC 3972, (Mar. 2005), 21 pages.
Back, Adam "Hashcash—A Denial of Service Counter-Measure", (Aug. 1, 2002), 10 pages.
Back, Adam "The Hashcash Proof-of-Work Function", Draft-Hashcash-back-00, Internet-Draft Created, (Jun. 2003), 5 pages.
Balfanz, Dirk et al., "Talking to Strangers: Authentication in Ad-Hoc Wireless Networks", In Symposium on Network and Distributed Systems Security, San Diego, CA; http://citeseer.ist.psu.edu/balfanz02talking.htm, (Mar. 11, 2002), 14 pages.
Bassi, et al., "Towards an IPv6-based Security Framework for Distributed Storage Resources", *Communications and Multimedia Security CMS* 2003, (Oct. 2, 2003), 9 pages.
Benantar, M "The Internet Public Key Infrastructure", IBM Systems Journal, vol. 40, No. 3, (2001), pp. 648-665.
Blaze, et al., "The Keynote Trust-Management System Version 2", *IETF Network Working Group*, (Sep. 1999), 38 pages.
Bouvin, Niels O., "Designing User Interfaces for Collaborative Web-Based Open Hypermedia", *in Proceedings of the Eleventh ACM Conference on Hypertext and Hypermedia*; San Antonio, TX, (2000), pp. 230-231.
Boyer, David et al., "Virtual Social Clubs: Meeting Places for the Internet Community", *International Conference on Multimedia Computing and Systems*; Florence, Italy, (Jun. 7-11, 1999), pp. 297-301.
Burrows, Martin et al., "A Logic of Authentication", *Proceedings of the Royal Society of London Series A*, 426, (1989), 51 pages.
Castro, Miguel et al., "Secure Routing for Structured Peer-to-Peer Overlay Networks", *Proceedings of the 5th Usenix Symposium on Operating Systems Design and Implementation*, Boston, MA. Retrieved from <<http://www.cs.rice.edu/—dwallach/pub/osdi2002.pdf>> on Mar. 11, 2011., (Dec. 2002), 33 pages.
Castro, Miguel et al., "Topology-Aware Routing in Structured Peer-to-Peer Overlay Networks", *Technical Report MSR-TR-2002-82, Microsoft Research, Microsoft Corporation*, retrieved from http://www.research.microsoft.com in 2009, (2009),19 pages.
Cheng, Lili et al., "Hutchworld: Lessons Learned. A Collaborative Project: Fred Hutchsinson Cancer Research Center & Microsoft Research", In Proceedings of Virtual World Conference 2000, Paris, France; http://research.microsoft.com/scg/papers/hutchvw2000.pdf, (Jun. 2000), pp. 1-12.
Cheng, P et al., "Design and Implementation of Modular Key Management Protocol and IP Secure Tunnel on AIX", (Jun. 1995), 15 pages.
Cheng, P. "An Architecture for the Internet Key Exchange Protocol", *IBM Systems Journal*, vol. 40, No. 3, (2001), pp. 721-746.
Cheng, P.C. et al., "A Security Architecture for the Internet Protocol", vol. 38 No. 1, (1998), pp. 42-60.
Cheung, Tony "Chatopus for Palm OS, Using IM Bots Jabber", *Chatopus-Palm OS Instant Messaging Client for XMPP/Jabber*; http://www.chatopus.com/articles/bots.html, (Oct. 20, 2002), 6 pages.
Clark, D. "IP Datagram Reassembly Algorithms", *RFC* 815 (Jul. 1982), 11 pages.
Cugola, et al., "Peer to Peer for Collaborative Applications", *In proceedings of the 22nd International Conference on Distributed Computing Systems Workshops* (ICDCS'02), (Jul. 2002), pp. 359-364.
Deering, S et al., "Version 6 (IPv6) Specification", *RFC*2460 (Dec. 1998), 35 pages.

Dorohonceanu, Bogdan et al., "A Desktop Design for Synchronous Collaboration", *in Proceedings of the Graphics Interface'99* (GI'99); Kingston, Ontario, Canada, (Jun. 1999), 9 pages.

Dryer, D.C. "At What Cost Pervasive? A Social Computing View of Mobile Computing Systems", *IBM Research: vol. 38, No. 4, Pervasive Computing*, (1999), 25 pages.

Duhr, Peter "Oberflachenelemente in interaktiven and kooperativen anwendungen", *Universitat Oldenburg, Department of Information Systems Thesis*, (Aug 2000), 107 pages.

Eastlake, "Domain Name System Security Extensions", *IETF Network Working Group*, (Mar. 1999), 44 pages.

Farnham, Shelly et al., "Supporting Sociability in a Shared Browser", In Proceedings of Interact Conference, Tokyo, Japan;http://research.microsoft.com/scg/papers/sharedbrowsinginteract.pdf, (Jul. 2001), pp. 1-8.

Ferguson, et al., "Network Ingress Filtering: Defeating Denial of Service Attacks Which Employ IP Source Address Spoofing", *IETF Network Working Group*, (May 2000), 10 pages.

Garcia, Octavio et al., "Extending a Collaborative Architecture to Support Emotional Awareness". *EBAA '99—Workshop on Emotion-Based Agent Architectures*, (May 2, 1999), pp. 46-52.

Gehrmann, C et al., "Manual Authentication for Wireless Devices", (Jan. 23, 2004), pp. 1-9.

Greenberg, Saul "Collaborative Interfaces for the Web", *in Human Factors and Web Development, (Forsythe, et al., eds.) Chapter 18, LEA Press*, (1997), pp.241-253.

Greenberg, Saul et al., "Using a Room Metaphor to Ease Transitions in Groupware", *University of Calgary, Department of Computer Science, Research Report 98/611/02*, (1998), 32 pages.

Gutwin, Carl "Workspace Awareness in Real-Time Distributed Groupware", *The University of Calgary, Department of Computer Science, Ph.D. Thesis*, (Dec 1997), 292 pages.

Handley, M et al., "SIP: Session Initiation Protocol", Retrieved from:<ftp://ftp.isl.edu/in-notes/rfc2543.txt> on Aug. 26, 2004, (Mar. 1999), 143 pages.

Harkins, D et al., "The Internet Key Exchange (IKE)", *Network Working Group RFC 2409*, (Nov. 98), 39 pages.

Higginson, P. et al., "Development of Router Clusters to Provide Fast Failover in IP Networks", *Digital Technical Journal* vol. 9, No. 3, (1997), pp. 32-41.

Hinden, et al., "IP Version 6 Addressing Architecture", (25 pages),Feb. 2, 2001.

Hinden, et al., "IP Version 6 Working Group Minutes", *Minneapolis IETF*, (Mar. 18, 2002), 13 pages.

Housley, et al., "Internet X.509 Public Key Infrastructure Certificate and Certificate Revocation List (CRL) Profile", IETF Network Working Group, (Apr. 2002), 121 pages.

Housley, R "Using Advanced Encryption Standard (AES) CCM Mode with Ipsec Encapsulating Security Payload (ESP", *Comments*: 4309, (Dec. 2005), 13 pages.

Huitema, "Ipv6 The New Internet Protocol", *Prentice Hall PTR*, ISBN 0-13-850505-5, (1998), 10 pages.

Johnson, et al., "Mobility Support in IPv6", (Nov. 17, 2000),115 pages.

Joseffson, S et al., "The Base16, Base32, and Base64 Data Encodings", *IETF Standard, Internet Engineering Task Force, IETF, CH*, (Jul. 2003), 14 pages.

Karn, et al., "Photuris: Session-Key Management Protocol", *IETF Network Working Group*, (Mar. 1999), 75.

Kaufman, C "Internet Key Exchange (IKEv2) Protocol", *RFC 4306*, (Dec. 2005), 93 pages.

Kempf, et al., "Threat Analysis for IPv6 Public Multi-Access Links", draft-kempf-ipng-netaccesss-threats-00.txt, (Nov. 2001), 8 pages.

Kent, C et al., "Fragmentation Considered Harmful", *Computer Communication Review (Association of Computer Machinery)*, 25(1), (Jan. 1995),13 pages.

Kent, et al., "IP Encapsulating Security Payload (ESP)", *Network Working Group, Comments 4303*, (Dec. 2005), 42 pages.

Kent, S "IP Authentication Header", *Network Working Group, Comments: 4302*, (Dec. 2005), 35 pages.

Kent, S "Security Architecture for the Internet Protocol", Network Working Group, Comments: 4301, (Dec. 2005),102 pages.

Kent, S et al., "IP Encapsulating Security Payload (ESP)", *Network Working Group RFC 2406*, 9Nov. 1998), 21 pages.

Kent, S. "Security Architecture for the Internet Protocol", Retrieved from: <http://rfc.net/rfc2401.html> on Aug. 7, 2007, RFC2401 Network Working Group, (Nov. 1998), 66 pages.

Kindberg, Tim "Mushroom: A Framework for Collaboration and Interaction Across the Internet", *Proceedings of the Fifth ERCIM Workshop on CSCW and the Web*(St. Augustin, Germany), (Feb. 1996), 11 pages.

Kollock, Peter et al., "Managing the Virtual Commons: Cooperation and Conflict in Computer Communities", University of California, Los Angeles; http://research.microsoft.com/scg/papers/KollockCommons.htm, (1996), 18 pages.

Kollock, Peter et al., "The Economies of Online Cooperation: Gifts and Public Goods in Cyberspace", *Communities in Cyberspace*; http://www.sscnet.ucla.edu/soc/faculty/kollock/papers/economies.htm, (1998), pp. 1-17.

Koskiahde, T "Security in Mobile IPv6", (Apr. 18, 2002), pp. 1-16.

Laganier, J "Using IKE with IPv6 Cryptographically Generated Address", *Network Working Group, Internet-Draft*, (Feb. 24, 2003), pp. 1-14.

Laganier, J "Using IKE with IPv6 Cryptology Generated Address", *Network Working Group, Internet-Draft*, (Jul. 8, 2007), 21 pages.

Lee, Jang H., et al., "Supporting Multi-User Multi-Applet Workspaces in CBE", In Proceedings of the ACM 1996 Conference on Computer Supported Cooperative Work; Cambridge, MA, (1996), pp. 344-353.

Link, B et al., "RTP Payload Format for AC-3 Audio", *RFC 4148* (Oct. 2005), 13 pages.

Liscano, Ramiro "Presence and Awareness Services", *Ramiro Liscano, Professor, SITE, University of Ottawa*, Available at <http://read.pudn.com/downloads103/doc/comm/421942/PresenceAwarenessServices.pdf>,(Jun. 11, 2003), 89 pages.

Maughan, et al., "Internet Security Association and Key Management Protocol (ISAKMP)", *The Internet Society, RFC 2408*, (Nov. 1998), 81 pages.

Mazieres, et al., "Separating Key Management From File System Security", *Operating Systems Review ACM*, vol. 33, No. 5, (Dec. 1999), pp. 124-139.

McCune, Jonathan M., et al., "Seeing-Is-Believing: Using Camera Phones for Human-Verifiable Authentication", *School of Computer Science, Carnegie MEllon University*, Available at <http://reports-archive.adm.cs.cmu.edu/anon/2004/CMU-CS-04-174.pdf>, (Nov. 2004), pp. 1-20.

Mills, "Simple Network Time Protocol (SNMP) Version 4 for IPv6 and OSI", *RFC2030*, (Oct. 1996), 19 pages.

Montenegro, et al., "Statistically Unique and Cryptographically Verifiable Identifiers and Addresses", *In Proc. ISOC Symposium on Network and Distributed System Security (NDSS 2002)*, San Diego, (Feb. 2002), 13 pages.

Narten, et al., "Neighbor Discovery For IP Version 6 (IPv6)", *IETF Network Working Group*, (Dec. 1998), 87 pages.

Narten, et al., "Privacy Extensions for Stateless Address Autoconfiguration in IPv6", *IETF Network Working Group*, (Jan. 2001),16 pages.

Nikander, "A Scaleable Architecture for IPv6 Address Ownership", *Internet Draft*, (Mar. 2001), 27 pages.

Nikander, et al., "Binding Authentication Key Establishment Protocol for Mobile IPv6", *Draft perkins-bake-o1-txt*, (Jul. 2, 2001), 42 pages.

Nikander, et al., "Threat Models Introduced by Mobile IPv6 and Requirements for Security in Mobile IPv6", draft-team-mobileipmipv6-sec-regts-00.txt, (Sep. 24, 2001), 32 pages.

Nir, Y "Repeated Authentication in Internet Key Exchange (IKEv2) Protocol", *RFC 4478*, (Apr. 2006), 6 pages.

Nordmark, "Allocating bit in IID for Mobile IPv6", http://ietf.org/jproceedings/02mar/slides/ipv6-13.pdf, (Mar. 2002), 8 pages.

Nordmark, "Reserving Space in the Interface ID", http://ietf.org/proceedings/02mar/slides/ipv6-14.pdf, (Mar. 2002), 6 pages.

Okazaki, et al., "Securing Mipv6 Binding Updates Using Address Based Keys (Abks)", *Internet-Draft*, (Oct. 2002), 25 pages.

O'Shea, et al., "Child-Proof Authentication for MIPv6 (CAM)", *ACM Computer Communications Review* 31(2), (Apr. 2001), 5 pages.

Perkins, "IP Mobility Support", *RFC2002*, (Oct. 1996), 74 pages.

Roe, et al., "Authentication of Mobile IPv6 Binding Updates and Acknowledgments", *Internet Draft IETF Mobile IP Working Group*, (Feb. 2002), 23 pages.

Savola, "Security of IPv6 Routing Header and Home Address Options", *Internet Draft, IETF*, (Dec. 2002),18 pages.

Shamir, "Identity-Based Cryptosystems and Signature Schemes", In Advances in Cryptology: Proc. CRYPTO 84, vol. 196 of LNCS., (1998), pp. 47-53.

Shannon, C et al., "Characteristics of Fragmented IP Traffic on Internet Links", *Internet Measurement Conference*, (2001), pp. 83-97.

Thomas, "Binding Updates Security", draft-thomas-mobileip-bu-sec-00.txt, (Nov. 2, 2001),13 pages.

Thomson, et al., "IPv6 Stateless Address Autoconfiguration", *RFC2462*, (Dec. 1998), 24 pages.

Thomson, et al., "IPv6 Stateless Address Autoconfiguration", *RFC1971*, http://www.ietf.org/rfc1971.txt, (Apr. 11, 2006), 22 pages.

Van De Snapschout, JLA "The Sliding Window Protocol Revisited", *Formal Aspects of Computing*, vol. 7, (1995), pp. 3-17.

"Foreign Issue Notification", Chinese Application No. 200510082279.3, (Jan. 26, 2011), 4 pages.

"Foreign Office Action", Chinese Application No. 200510082279.3, (Jun. 5, 2009), 11 pages.

"Foreign Office Action", Chinese Application No. 200510082279.3, (May 26, 2010), 7 pages.

"Foreign Office Action", European Application No. 05105417.9-1245, (Jun. 27, 2007), 7 pages.

"Foreign Office Action", European Application No. 05105417.9-1245, (Dec. 9, 2008), 7 pages.

"Foreign Office Action", European Application No. 05105417.9-1245, (Sep. 10, 2009), 6 pages.

"Foreign Office Action", Japanese Application No. 2005-184991, (Jul. 19, 2011), 6 pages.

"Foreign Office Action", Korean Application No. 10-2005-56988, (Jun. 28, 2011), 5 pages.

"Notice of Allowance", Chinese Application No. 200510082279.3, (Sep. 15, 2010), 4 pages.

Moskowitz, "Host Identity Payload and Protocol", available at <http://tools.ietf.org/html/draft-moskowitz-hip-04>, (Jul. 2001), 18 pages.

Tannenbaum, AS "Computer Networks", Chapter 4, Prentice-Hall, (1989), 76 pages.

* cited by examiner

US 8,086,842 B2

PEER-TO-PEER CONTACT EXCHANGE

BACKGROUND

Directory services may typically be provided using a network server. In order to utilize the directory services, a user may be required to connect to the server and have a user account in order to access the directory service. Additionally, the user may have to trust the server to provide data integrity and data authentication. If the directory service is intended for a smaller group of connected entities, for example an ad hoc network, then creating and setting up a directory server for that ad hoc network may be inefficient. For example, ad hoc networks may typically be transient in nature, and the cost of setting up a dedicated server for short durations and for a small number of users may be too costly, due to administrator time, equipment resource capacity (some server must be reallocated or added), and user time (user may be involved in account creation and setup). Moreover, while server based systems may be common, new serverless systems such as peer-to-peer networks, may provide greater flexibility in creating ad hoc networks because they may not require a dedicated server to facilitate communications. However, to enable secure communications over these ad hoc networks using existing encryption processes, a directory service may be required to facilitate public key exchange that does not rely on a server based model.

SUMMARY

A system may publish authenticated contact information in a publicly available index store. The system may also provide a method of retrieving the contact information and validating it. The claimed method and system may be client based, with a server being optional. The publicly available index store may be a distributed hash table used in a peer-to -peer network. The system may be used in other secure directory service applications where a server may not be available or where server trust may be minimal.

In one embodiment, the system may be used as a general message publishing system. In another embodiment, the system may be used to provide selective publication in which a posted record may only be retrieved and read by an intended recipient.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
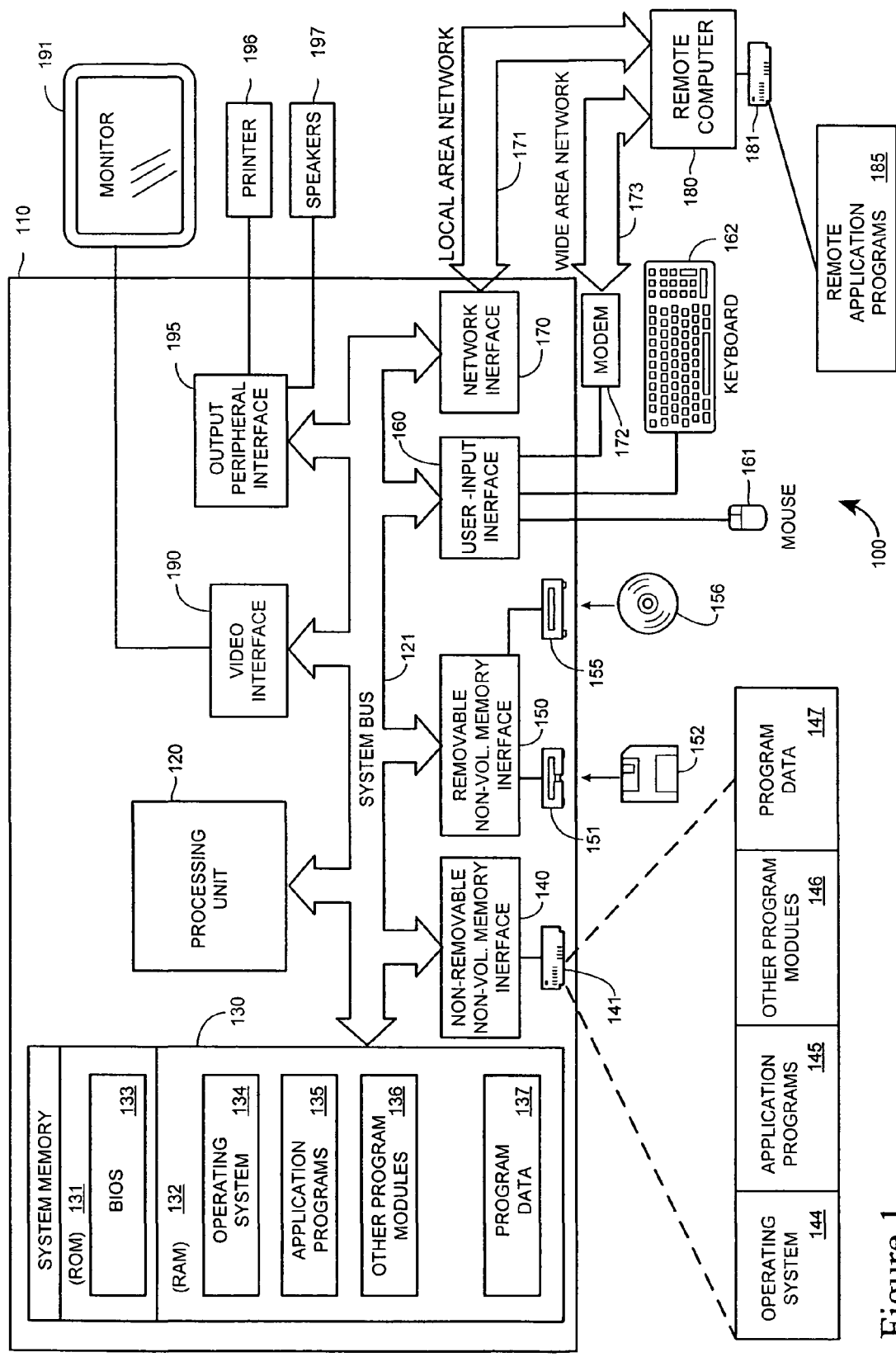
FIG. 1 illustrates a block diagram of a computing system that may operate in accordance with the claims.

FIG. 1 illustrates an example of a suitable computing system environment 100 on which a system for the blocks of the claimed method and apparatus may be implemented. The computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

The blocks of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The blocks of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media may be any available media that may be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components may either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections illustrated are exemplary and other means of establishing a communications link between the computers may be used.

Peer-to-peer (P2P) systems employ a network of nodes that communicate with each other in a decentralized manner, e.g., without the aid of a central server. Each node (e.g., an application or a device) in the peer-to-peer network may communicate with another node on the network through a direct connection, or each node may communicate indirectly using one or more intermediate nodes to relay communications to an intended node.

Figure 2:
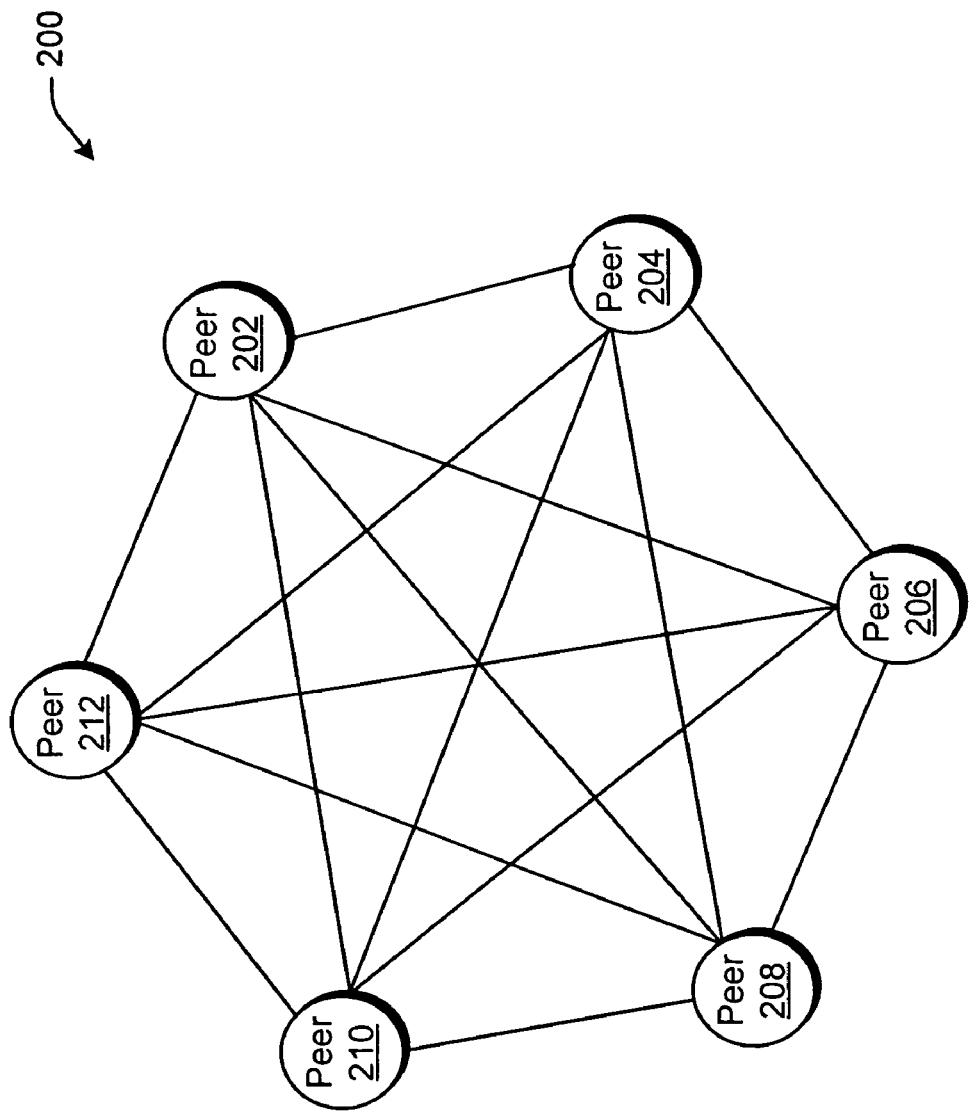
FIG. 2 illustrates a general peer-to-peer network.

FIG. 2 illustrates a high-level depiction of a P2P system 200. The system 200 includes a collection of peer entities (202-212). The peer entities (202-212) may be personal computer devices that are coupled together via a network or combination of networks. FIG. 2 illustrates an example in which each peer entity (202-212) is connected to all other peer entities (202-212). In other cases, one or more peer entities (202-212) may be connected to other peer entities (202-212) via one or more intermediary participants (202-212). However, in order to provide secure communication on a peer-to-peer network, secure connections between peer nodes may first need to be established.

Figure 3:
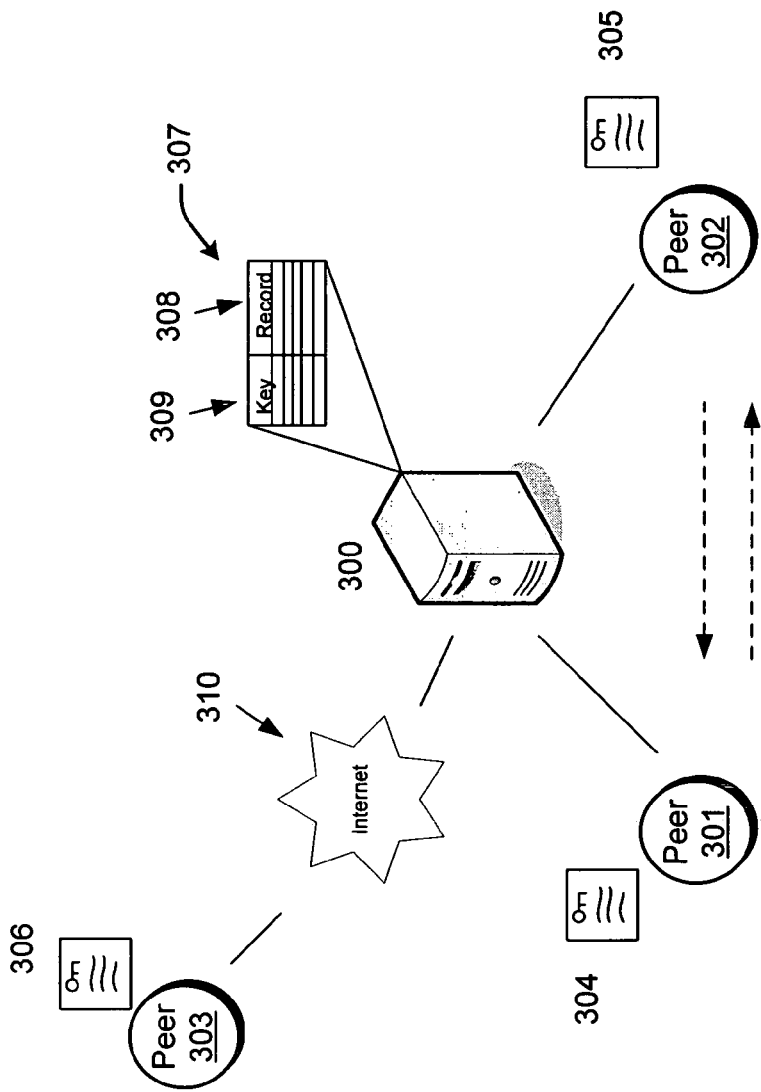
FIG. 3 illustrates a general director server and service.

Connection security may be based on a symmetric key encryption process, as may be commonly known in the art. In order to implement this encryption security, however, peer entities may need to first exchange certificates and/or public keys which enable a secure connection to be initially established. In some existing systems, such as that illustrated in FIG. 3, this exchange may be facilitated using a central directory server 300 where users 301, 302, 303 may post their certificates 304, 305, 306 and/or public keys on the directory server 300. A directory service 307 may be a database table containing records 308 of certificates and/or public keys indexed under a username or other identifier used as a key 309. A user capable of connecting to the directory server 300 and allowed access to the directory service 307 may lookup a target user using the target user's identifier, and obtain the target user's corresponding public key. This approach may require connectivity to the server 300, explicit signup with the directory server 300, and trust in the directory server 300. Furthermore, someone must incur the cost of hosting such as server. When a user 303 is connecting from a remote location, Internet connectivity 310 may additionally be required. The server signup process may involve user accounts that are used to promote trust in the directory server 300. For example, if any user could access the server 300, the server 300 may be viewed as more susceptible to compromise, especially if security information is being posted and exchanged, such as public keys. Further, creating a directory server for an ad hoc, temporary network may be impractical because of the transient nature of these networks and the difficulty in setting up a directory server. A possible workaround for an ad hoc peer-to-peer network may be to exchange public keys via email or via an off network process, such as physically sending or mailing a diskette containing a certificate/public key to a target member. This may enable the peer entities to establish server independent, secure links. However, this may be cumbersome and error-prone.

Figure 4:
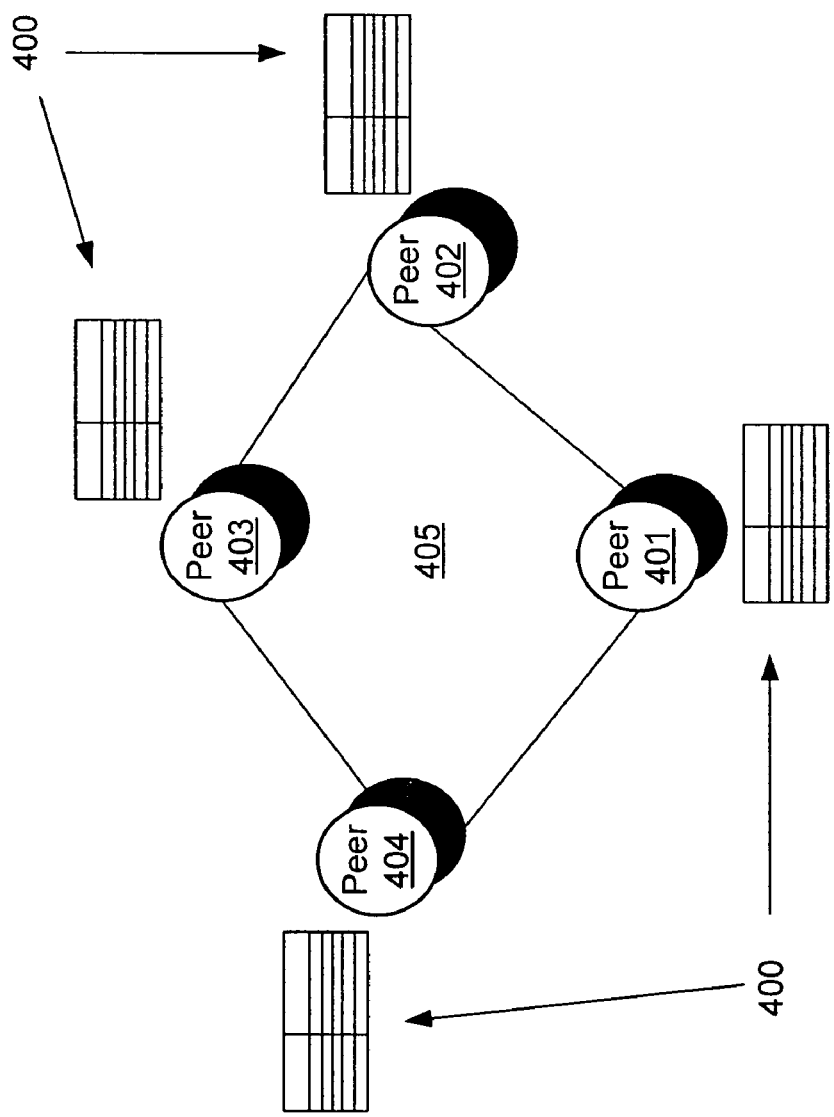
FIG. 4 illustrates a distributed hash table.

An embodiment of the claimed server-independent indexing process may use a serverless index store, such as a distributed hash table (DHT) 400 illustrated in FIG. 4. This distributed hash table 400 may be maintained over a group of peer entities 401-404 that form a peer-to-peer network 405. The entries in a distributed hash table may be logically divided or grouped using, for example, a hash function. The hash function may clump records together in some organized manner, thereby making retrieval more efficient. A DHT may have two primary properties: 1) distribution of a table (e.g., table 400), across a plurality of nodes (e.g., nodes 401-404); and 2) a routing mechanism (not shown) that provides a method for publishing and retrieving records. The routing mechanism and distribution may be managed by an overlay protocol such as Chord, PNRP, Pastry, Tapestry, etc. While a DHT may be used to provide an index store in accordance with an embodiment of the claims, it is emphasized that any index store which may be easily accessed by a group of peer entities may be used, including server-based indices. In the case of a server-based indices, the claimed system may reduce the level of trust required from the server alone because the claimed system may provide the necessary level of security for an unsecured index store.

Figure 5:
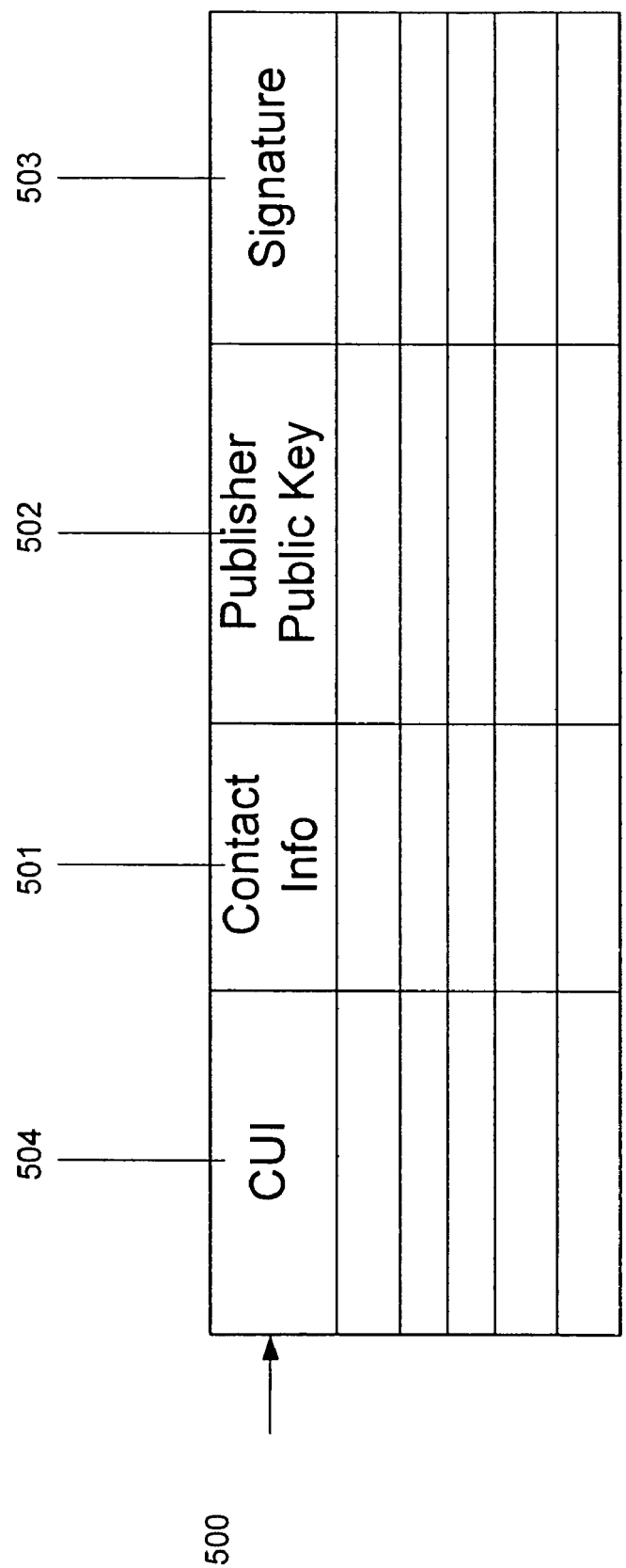
FIG. 5 illustrates a record used in an embodiment of the claims.

An embodiment of the claimed server-independent indexing process may use a particular record format, as illustrated in FIG. 5. FIG. 5, illustrates that a publisher may post to the index store a record 500 containing contact information 501, the publisher's public key 502 and a signature 503 of the contact information using the publisher's private key. Alternatively, the signature may be for a combination of the contact information and public key. This record may be indexed by a record key 504. In one embodiment, the key 504 of the record may be a cryptographically unique identifier (CUI). A CUI may have two primary properties. First, the CUI may be statistically unique and second, the CUI may correspond to a particular user public key, such as the publisher public key 502. Similar to common database indexing schemes, a record key may need to be unique to prevent duplicate entity entries. Accordingly, a CUI may be one that is derived such that there is a high probability that it is unique for a particular situation or application. For example, in a peer group of only a few members, the CUI may be statistically unique if the probability that a cryptographically unique identifier may be derived from the same member public key is unlikely for the group size.

The CUI may be derived from a public key using an algorithm, such as a hash or encryption algorithm. The CUI may be verified to correspond or match with its public key using the algorithm. In one embodiment, the CUI may be used to represent a longer user identifier, such as a public key, in a shorter more user manageable form such as the peer names used in a P2P system described in U.S. patent application Ser. No. 10/882,079, entitled "Callsigns."

The record of FIG. 5 may be used to publish contact information to an index store, such as the DHT 400 of FIG. 4. The CUI key 504 may be used to locate each record 500 and retrieve the contact information 501 and public key 502. In this embodiment, the published information may be public, i.e., the published information may not be encrypted, except for the signatures. However, other embodiments described below may encrypt portions of the published information. Also, while this embodiment illustrates using a record 500 to facilitate public key 502 exchange, it is emphasized that the system may be used in any application in which a unique message publication may be used. For example, instead of contact information 501, any message may be posted against a user CUI 504.

Figure 6:
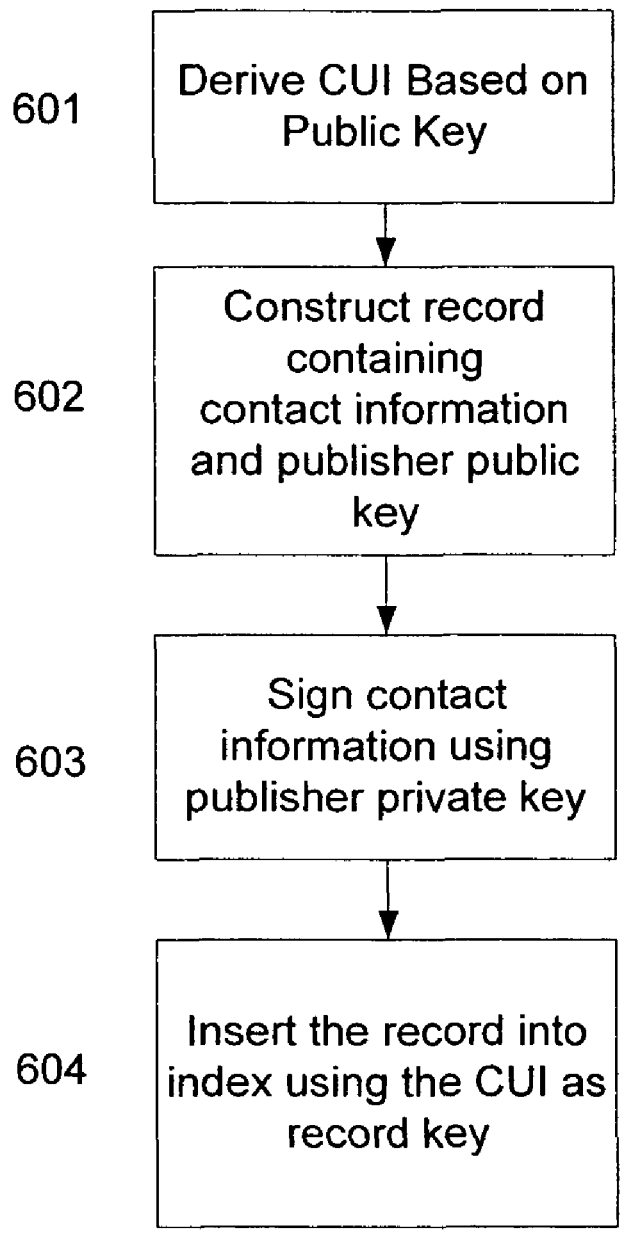
FIG. 6 illustrates a publishing process embodiment.

FIG. 6 illustrates a general publishing process in accordance with an embodiment of the claims. Using an algorithm such as a hash function, a CUI may be generated for a given user's public key 601. It is important to note that whatever algorithm may be used, that the CUI may be verified to correspond to the public key that was used to generate it. A record of the contact information, or other message data, and publisher's public key may be constructed 602 and the contact information and/or publisher's public key may be signed by the publisher's private key 603 (which may correspond to the public key). The record, including the contact information, the public key and the signature may be inserted 604 into a publicly available index. The record may be indexed by the CUI corresponding to the publisher public key.

Figure 7:
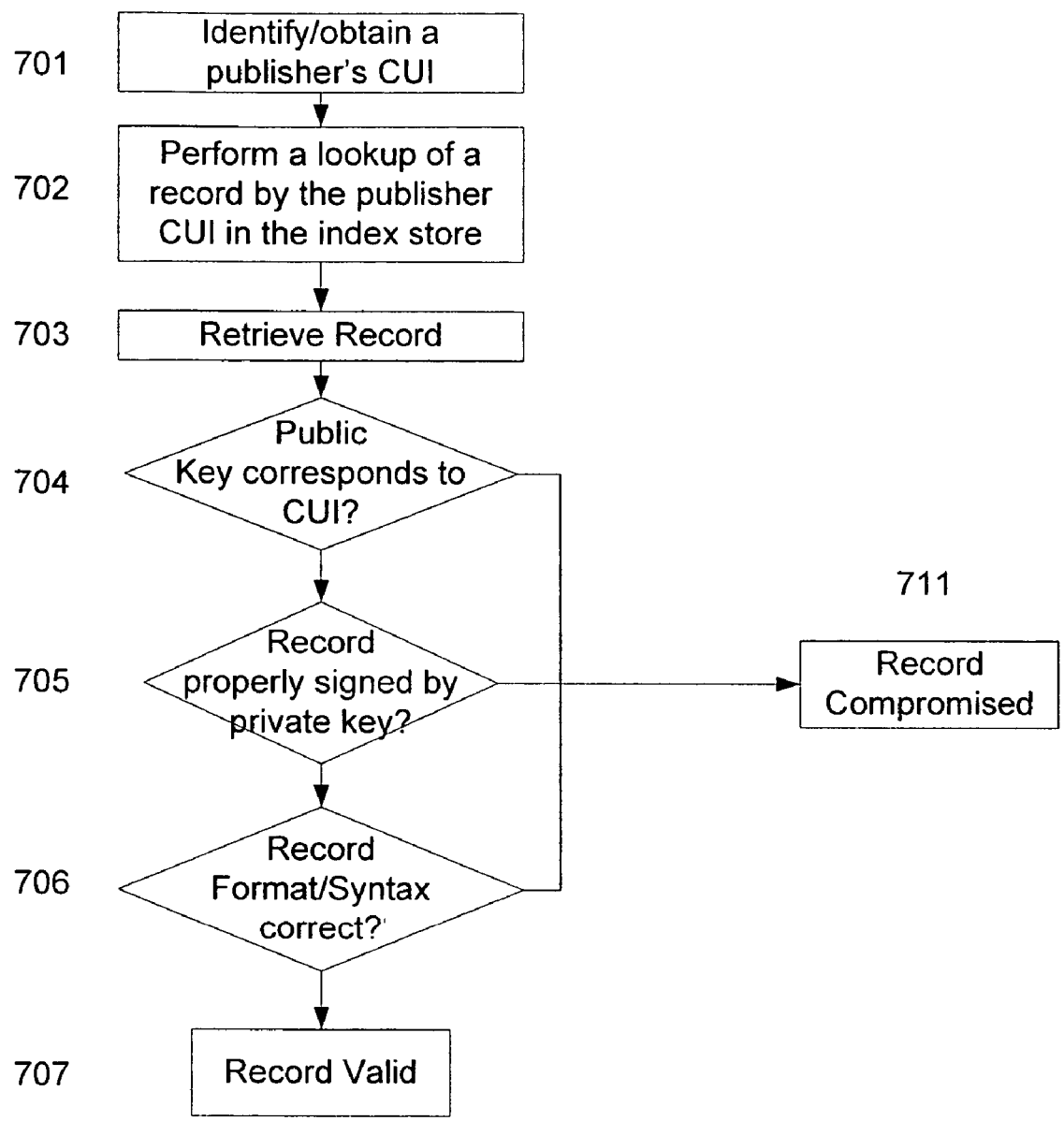
FIG. 7 illustrates a retrieval process embodiment.

FIG. 7 illustrates a retrieval process in accordance with an embodiment of the claims. A user desiring to connect with a second peer may obtain the CUI of the second peer 701. The CUI may be obtained out of band either through email or off network process (e.g., snail mail, verbal communication, business card, etc.). The CUI may then be used to lookup up a record mapped to the CUI in the index store 702. As discussed above, a record may include a key, some message information (contact information), and a signature.

The user may then query the index store to retrieve a record based on the CTJI 703. Once the CUI is retrieved, the CUI may be verified using the public key contained in the record to ensure that they correspond to each other 704. This process block may be used to verify that the record corresponds to the CUI. The CUI may be made statistically unique to the public key in any number of ways. In one embodiment, the peer communication system may pre-establish a common mapping process, for example using a recognized hash function. This initial verification process helps to ensure that the record may indeed correspond to the given CUI.

If the CUI maps properly, then the signature of the record may then be used to determine whether the signature is signed by a corresponding private key of the publisher 705. This may authenticate the message by providing evidence that the message originated from the publisher, as it may be assumed that the publisher owns the private key corresponding to the public key used for the encryption.

If the record/message is properly signed, a message format and/or syntax check 706 may then be performed on the contact information of the record. This may be used, for example, to ensure that the message was not hacked to match the signature. While providing a hacked message to match an encrypted signature may be statistically difficult, it may not be impossible. Hacking, however, may result in a message that does not conform to intended or expected format. Thus, a first check of the message may be made to determine whether the message format complies with an expected format. For example, where contact information is communicated, the contact information may require a ten character format. If the record format does not provide this ten character format, then someone or something may have tampered with the message 711.

Alternatively, or in addition, the semantics of the message may be checked. For example, the contact information may be limited to a list of options and specific relations between those options. Therefore, if the format requires two entries, and the first entry is related to the second entry (semantics) and they do not match this expected format, then someone or something may have tampered with the message 711.

If all of the verifications processes 704, 705, 706 have been completed successfully, then the record may be authentic and subsequently used 707, for example, the public key may be used to establish communication links. If any of the verification steps 704, 705, 706 fails, then someone or something may have been tampered with the message 711. In the case of a public key exchange system, a connection may be refused.

Figure 8:
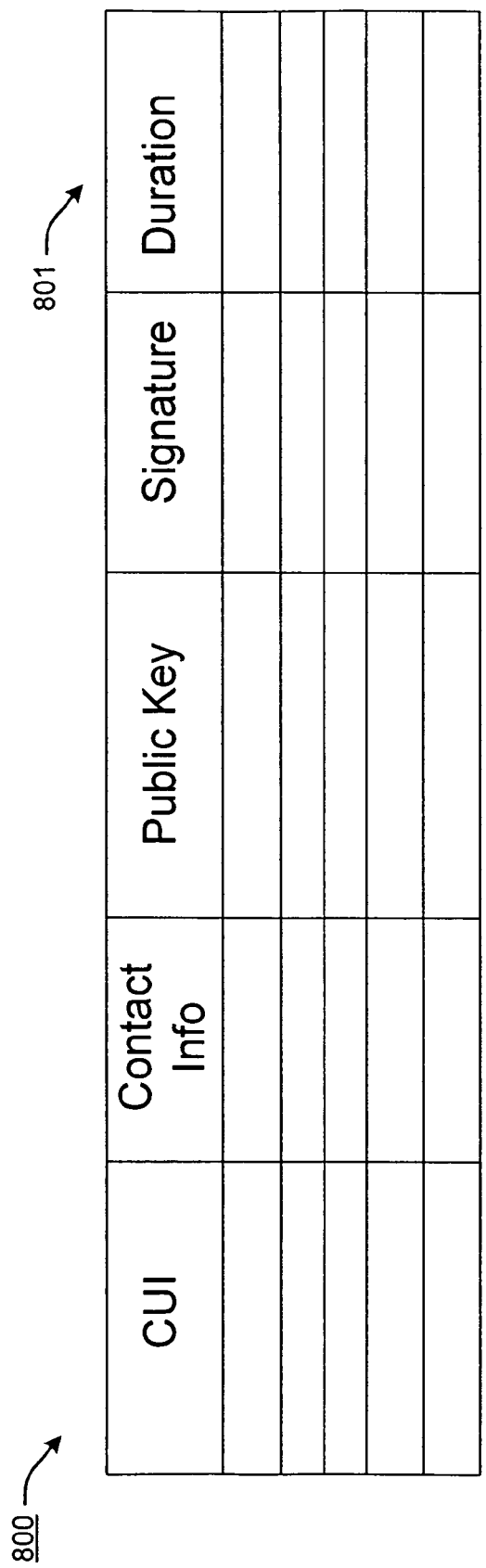
FIG. 8 illustrates a modified record containing a duration parameter.
Figure 9:
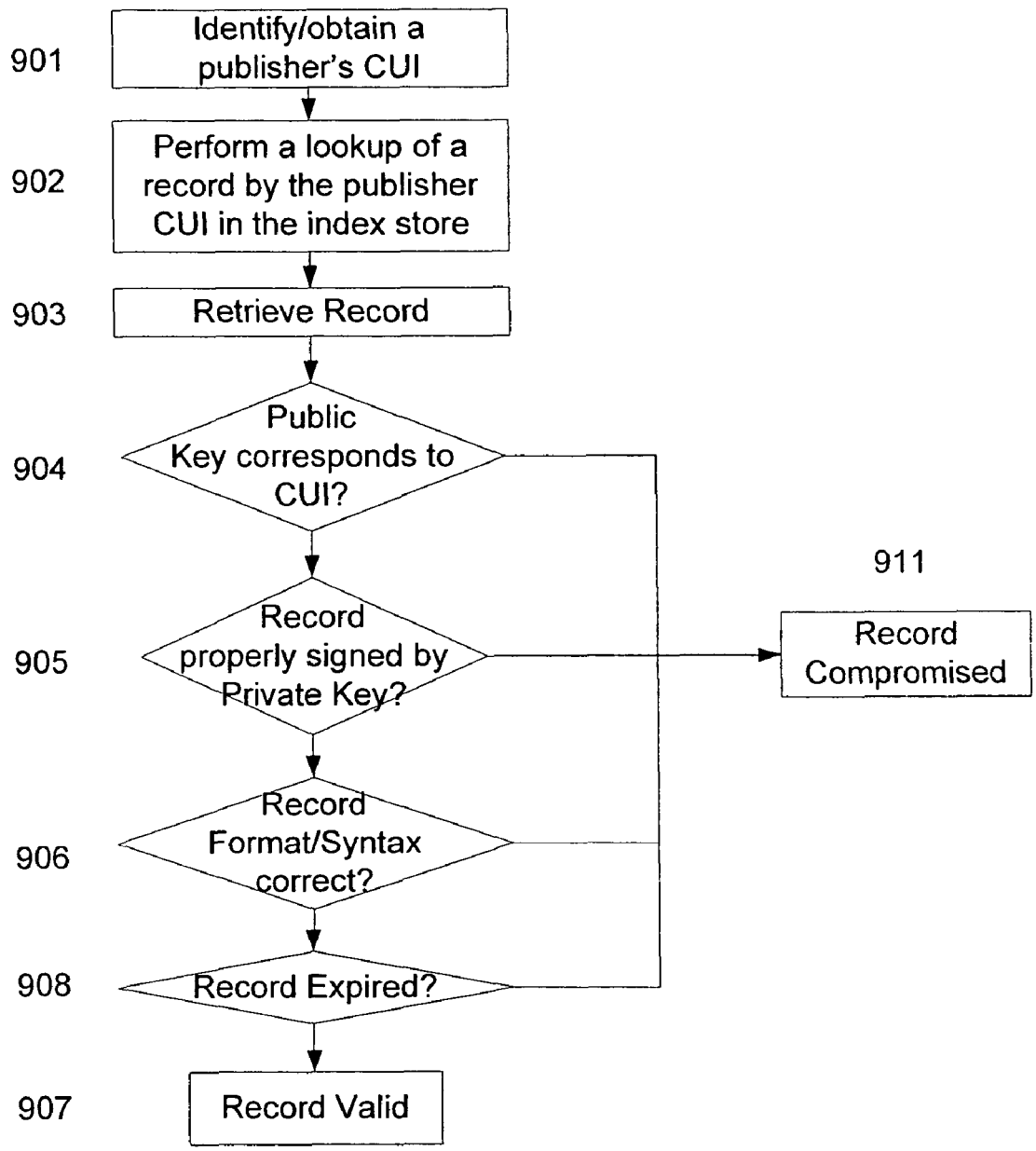
FIG. 9 illustrates an another validation process using a duration parameter.

In another embodiment illustrated in FIG. 8, a duration parameter 801 may be included with the record 800. This duration parameter 801 may correspond to a level of encryption used in the authentication process described. For example, the encryption level may correspond to the strength of the encryption used to generate the public/private key pairs used in the claimed system. If the encryption strength is high, then the duration may be long and vice versa. The duration parameter 801 may indicate a duration of validity for the record. Thus, the duration parameter 801 may be used in the retrieval process as illustrated in FIG. 9. FIG. 9 illustrates the same process of FIG. 7, with the addition of block 909, where the duration 901 indicated by the duration parameter 801 is checked to determine whether the duration has expired. If the duration parameter 801 is expired, then the record may be compromised 911. Otherwise the record may be valid 907.

Figure 10:
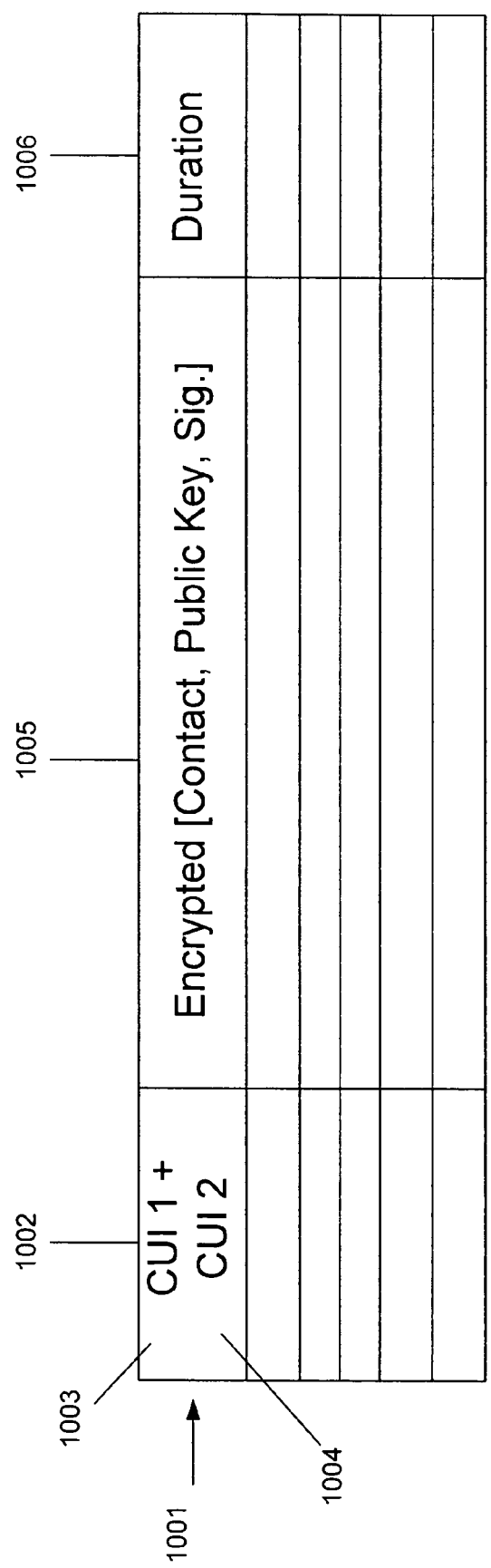
FIG. 10 illustrates a modified record for selective publication.
Figure 11:
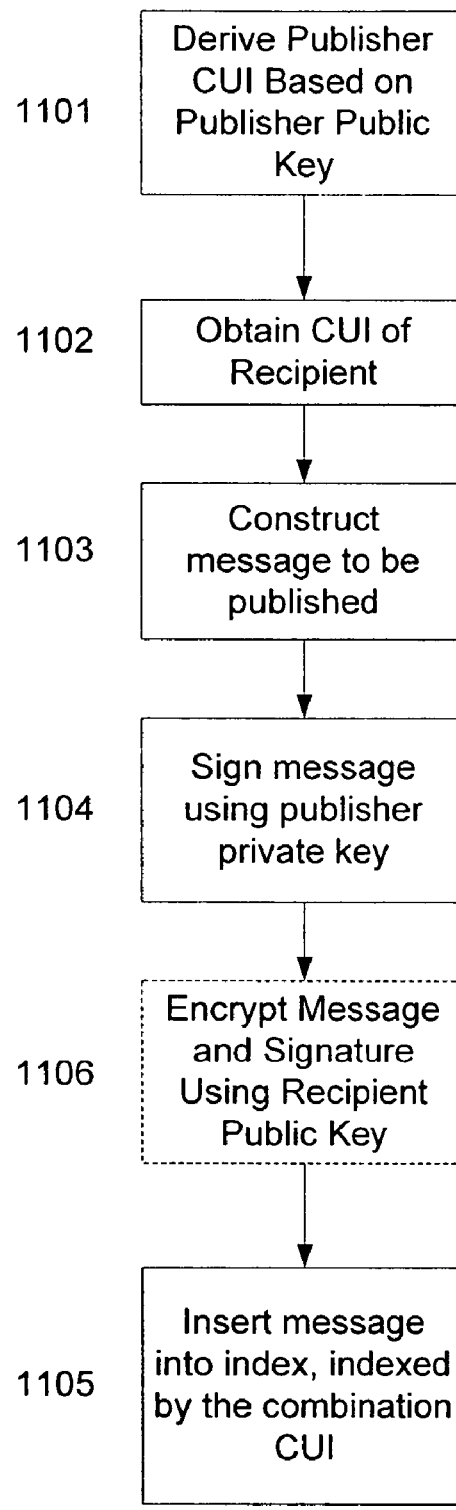
FIG. 11 illustrates a publishing process embodiment for selective publication.
Figure 12:
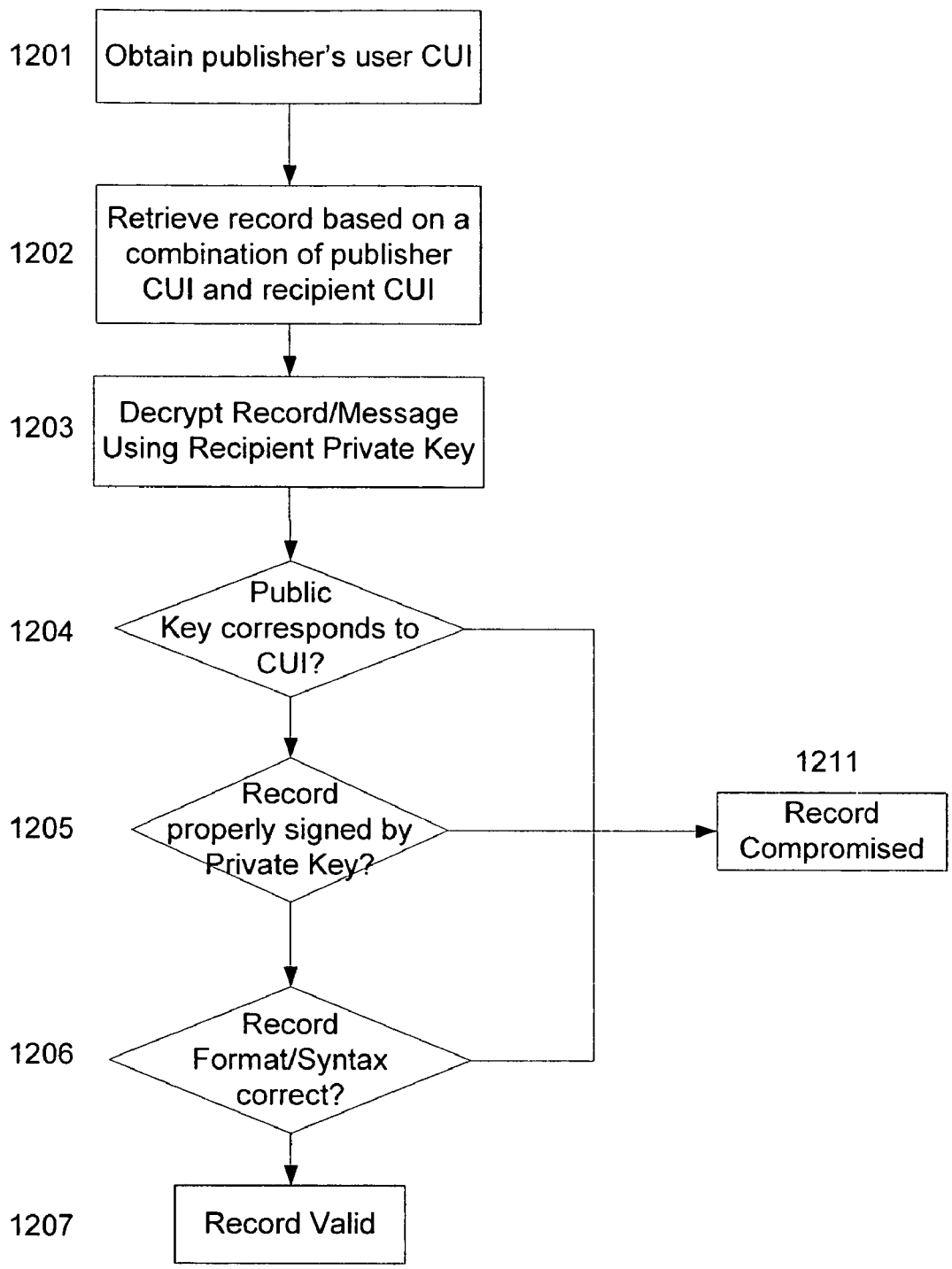
FIG. 12 illustrates a retrieval process embodiment for selective publication.

FIGS. 10-12 illustrates another embodiment where selective publication may be used to allow a first user to publish data that only a targeted second user may retrieve. In this selective publication embodiment, a record 1001, as illustrated in FIG. 10, may be used. The record 1001 may include a key 1002 that is formed from the combination of two CUIs 1003, 1004. The first CUI 1003 may be associated with a first user while the second CUI 1004 may be associated with a second user. The combination may be formed by simply appending the second CUI to the first CUI. This record may include a message portion 1005 and a duration parameter 1006. The message 1005 may contain data on a publisher's contact information, publisher public key, and a signature.

FIG. 11 illustrates a selective publishing process using the record 1001 of FIG. 10. A publisher could derive his CUI from a public key 1101, obtain a CUI of a selected recipient 1102, construct the message 1103, sign the message using the publisher's private key 1104 and insert the message into an index based 1105 on the CUI combination key 1101. Additionally, the message may be encrypted 1106 using the intended recipient's public key.

FIG. 12 illustrates a retrieval process for a selective publication process that is similar to FIG. 7 with the addition of blocks 1201, 1202, 1203. A recipient wishing to retrieve a published record may first obtain the CUI of the publisher 1201 and then lookup a record in the index store under the combined CUI key 1202. In a further enhanced embodiment, the message may be encrypted using a public key of the recipient. Thus, only the recipient may decrypt the intended data. After the recipient retrieves the message using the CUI combination key 1202, the recipient may use its private key to first decrypt the record 1203, after which the process of verification and validation follows that of FIG. 7. In this selective publication embodiment, the recipient's public key (used to encrypt the record) may be determined from the recipient CUI, which the publisher used to create the combination key.

In another enhancement of the above embodiment, the key may be a group public key, which is owned by a group of peers. In this embodiment, any member of the group may lookup a record under the group public key and perform the authentication process. The group of users may have access to the record and may be specifically targeted for receipt of a posted message.

It should be emphasized that while the specific embodiments described above may be associated with a public key exchange directory, the contact information may represent other data. For example, instead of contact information, the record may be a generic message posting. Thus, the claimed system may be used as a general publication system over any publicly accessible index store. The claimed system may also be used to provide directory services other than public key lookup. The claimed system enables existing distributed index stores, such as distributed hash tables, to function as secured directory services work without relying on a server.

Additionally, the claimed system may be used on existing server based directories where the server security may be minimal, thereby requiring the authentication process provided by the claimed system. In ad hoc systems such as peer groups and peer-to-peer networks, a serverless process of public key publication and retrieval may make the creation of such networks more efficient by reducing the need for a hosted, dedicated server to provide the directory service. The claimed method and system may also minimize user involvement because the public/private key encryption process may eliminate the need for a user to explicitly sign on to a server.

The invention claimed is:

1. A method of using a publicly available index store for a secure publication system, the method comprising:
    configuring a first computing device to be a publisher of contact information corresponding to the publisher, wherein:
        the contact information is required to be known by both the publisher and another node to enable an initial establishment of a secure connection between the another node and the publisher, and the contact information targeted for retrieval by only a user of the contact information;

the first computing device includes a first memory, a first processing unit, and first computer-executable instructions stored in the first memory and executable by the first processing unit to publish the contact information; at the publisher:

providing a first cryptographically unique identifier that is statistically unique to a public key of the publisher;

obtaining a second cryptographically unique identifier that is statistically unique to a public key of the user of the contact information;

appending the second cryptographically unique identifier to the first cryptographically unique identifier to form a combination key;

creating a publisher signature by signing the contact information with a publisher private key;

creating a single record corresponding to the contact information, wherein the single record includes and is indexed by the combination key, and wherein the single record includes the publisher public key, the publisher signature, and all of the contact information corresponding to the publisher; and inserting the record into a publicly available index store;

configuring a second computing device to be the user of the contact information, the second computing device including a second memory, a second processing unit, and second computer-executable instructions stored in the second memory and executable by the second processing unit to use the contact information to establish a secure connection with the publisher; and at the user:

obtaining the first cryptographically unique identifier;

retrieving the single record from the publicly available index store based on the combination key;

determining whether the first cryptographically unique identifier relates to the publisher public key included in the single record;

determining whether the contact information is signed by a private key corresponding to the publisher public key included in the single record;

establishing the secure connection with the publisher using at least a portion of the single record upon determining the first cryptographically unique identifier relates to the publisher public key included in the single record and the contact information is signed by the private key corresponding to the publisher public key included in the single record; and refusing to establish the secure connection with the publisher upon determining the first cryptographically unique identifier does not relate to the publisher public key included in the single record or the contact information is not signed by the private key corresponding to the publisher public key included in the single record, wherein the publisher and the user are different nodes in a peer-to-peer network.

2. The method of claim 1, further comprising:
determining, by the second computing device, whether the contact information has an expected format and syntax;
establishing the secure connection with the publisher using the at least the portion of the single record upon determining the contact information is determined to have the expected format and syntax; and
refusing to establish the secure connection with the publisher upon determining the contact information has an unexpected format or syntax.

3. The method of claim 1, wherein the index store is one of a distributed hash table and a directory server.

4. The method of claim 1, wherein the first cryptographically unique identifier is derived from the public key of the user using a hash function.

5. The method of claim 1, wherein the single record further includes a duration parameter that is proportional to an encryption strength.

6. The method of claim 5, further comprising at the second computing device:
establishing the secure connection with the publisher using the at least the portion of the single record upon determining that a duration indicated by the duration parameter has not expired; and
refusing to establish the secure connection with the publisher upon determining that the duration indicated by the duration parameter has expired.

7. The method of claim 1, wherein the first cryptographically unique identifier comprises a group public key.

8. A computer system comprising:
a plurality of peer nodes forming a peer-to-peer network;
a distributed hash table of the peer-to-peer network;
a first peer node from the plurality of peer nodes, the first peer node configured to:
publish contact information corresponding to the first peer node wherein the contact information is required to be known by both the first peer node and a second peer node from the plurality of peer nodes to enable an initial establishment of a secure connection between the first peer node and the second peer node, and the contact information targeted for retrieval by only the second peer node,
create a first cryptographically unique identifier that is statistically unique to a public key of the first peer node,
create a signature by signing the contact information with a private key of the first peer node,
obtain a second cryptographically unique identifier that is statistically unique to a public key of the second peer node,
append the second cryptographically unique identifier to the first cryptographically unique identifier to form a combination key,
create a single record corresponding to the contact information, wherein the single record includes and is indexed by the combination key, and wherein the single record includes the public key of the first peer node, the signature, and all of the contact information corresponding to the first peer node; and
insert the single record into the distributed hash table; and
the second peer node from the plurality of peer nodes, the second peer node configured to:
obtain the first cryptographically unique identifier;
retrieve the single record from the distributed hash table based on the combination key,
determine whether the first cryptographically unique identifier relates to the public key of the first peer node included in the single record,
determine whether the contact information is signed by a private key corresponding to the public key of the first peer node included in the single record,
determine whether the contact information has an expected format and syntax, establish a secure connection with the first peer node using at least a portion of the single record upon determining:
  the first cryptographically unique identifier relates to the public key of the first peer node included in the single record,
  the contact information is signed by the private key corresponding to the public key of the first peer node included in the single record, and
  the contact information has the expected format and syntax; and
refuse to establish the secure connection with the first peer node upon determining:
  the first cryptographically unique identifier does not relate to the public key of the first peer node included in the single record,
  the contact information is not signed by the private key corresponding to the public key of the first peer node included in the single record, or
  the contact information has an unexpected format or syntax.

9. The system of claim 8, wherein the contact information is encrypted using a public key of the second peer node and the contact information is decrypted using a private key of the second peer node.

10. The system of claim 8, wherein the single record further includes a duration parameter, wherein the duration parameter is proportional to the strength of an encryption algorithm used to generate the public key of the first peer node and the private key corresponding to the public key of the first peer node.

11. The system of claim 10, wherein the second peer node is configured to:
establish the secure connection with the first peer node using the at least the portion of the single record upon determining that a duration indicated by the duration parameter has not expired; and
refuse to establish the secure connection with the first peer node upon determining that the duration indicated by the duration parameter has expired.

12. A memory storage device on a first node having computer-executable instructions for performing operations comprising:
receiving a second cryptographically unique identifier corresponding to a second node;
retrieving an entry from an index store based on a combination key, the combination key including a first cryptographically unique identifier corresponding to the first node appended to the second cryptographically unique identifier corresponding to the second node, wherein:
  the entry contains a complete set of contact information corresponding to the second node and a public key corresponding to the second node;
  the entry further contains the combination key and is indexed by the combination key;
  the complete set of contact information is required to be known by both the first node and the second node to enable an initial establishment of a secure connection between the first node and the second node;
  the complete set of contact information and the public key corresponding to the second node are together signed by a private key corresponding to the public key corresponding to the second node; and
  the entry was previously entered into the index store by the second node;
determining whether the second cryptographically unique identifier relates to the public key corresponding to the second node;
determining whether the complete set of contact information and the public key corresponding to the second node are signed by the private key corresponding to the second node;
establishing the secure connection between the first node and the second node using at least a portion of the entry upon determining the second cryptographically unique identifier relates to the public key corresponding to the second node included in the entry and the contact information is signed by the private key corresponding to the public key corresponding to the second node included in the entry; and
refusing to establish the secure connection between the first and the second node upon determining the second cryptographically unique identifier does not relate to the public key corresponding to the second node included in the entry or the contact information is not signed by the private key corresponding to the public key corresponding to the second node included in the entry,
wherein the first node and the second node are different nodes in a peer-to-peer network.

13. The memory storage device of claim 12, further comprising:
determining whether the complete set of contact information has an expected format and syntax;
establishing the secure connection between the first node and the second node using the at least the portion of the single record upon determining the complete set of contact information has the expected format and syntax; and
refusing to establish the secure connection between the first node and the second node upon determining the complete set of contact information has an unexpected format or syntax.

14. The memory storage device of claim 12, further comprising determining whether a duration parameter of the entry has expired.

15. The memory storage device of claim 14, wherein a duration indicated by the duration parameter is proportional to a level of encryption used to generate the public key corresponding to the second node included in the entry and the private key corresponding to the second node.

16. The memory storage device of claim 12, wherein the complete set of contact information is encrypted using a public key of a computer associated with the second cryptographically unique identifier, and wherein the complete set of contact information is decrypted using a private key corresponding to the first node.

17. The method of claim 1, wherein establishing the secure connection with the publisher using the at least the portion of the single record comprises establishing the secure connection with the publisher using the publisher public key included in the single record.

18. The system of claim 8, wherein the second peer node establishes the secure connection with the first peer node using the public key of the first peer node included in the single record.

19. The method of claim 1, further comprising:
at the publisher, encrypting the contact information using the public key of the user; and
at the user, decrypting the contact information using a private key of he user.

* * * * *

UNITED STATES PATENT AND TRADEMARK OFFICE
CERTIFICATE OF CORRECTION

| | | |
|---|---|---|
| PATENT NO. | : 8,086,842 B2 | Page 1 of 1 |
| APPLICATION NO. | : 11/408894 | |
| DATED | : December 27, 2011 | |
| INVENTOR(S) | : Gursharan S. Sidhu et al. | |

It is certified that error appears in the above-identified patent and that said Letters Patent is hereby corrected as shown below:

In column 12, line 64, in Claim 19, delete "he" and insert -- the --, therefor.

Signed and Sealed this
Twenty-eighth Day of February, 2012

David J. Kappos
*Director of the United States Patent and Trademark Office*